(12) United States Patent
Mital et al.

(10) Patent No.: US 8,566,261 B2
(45) Date of Patent: Oct. 22, 2013

(54) INTERACTIVE RECOMMENDATIONS

(75) Inventors: Vijay Mital, Redmond, WA (US); R. Donald Thompson, III, Redmond, WA (US); Robert Povey, Redmond, WA (US); Gary Shon Katzenberger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/971,914

(22) Filed: Dec. 17, 2010

(65) Prior Publication Data

US 2012/0158622 A1 Jun. 21, 2012

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 7,472,110 B2 | 12/2008 | Achlioptas | |
| 7,797,345 B1 | 9/2010 | Martino et al. | |
| 7,945,891 B2 * | 5/2011 | Mital et al. | 717/100 |
| 2009/0319436 A1 | 12/2009 | Andra et al. | |
| 2010/0198778 A1 | 8/2010 | Venugopal et al. | |
| 2012/0078822 A1* | 3/2012 | Sathish et al. | 706/12 |

OTHER PUBLICATIONS

Yahia et al., "Building Community-Centric Information Exploration Applications on Social Content Sites", Retrieved at << http://69.147.108.248/files/sigmod09-jelly.pdf >>, 2009, pp. 6.
Bry et al., "Four Lessons in Versatility or How Query Languages Adapt to the Web", Retrieved at << http://furche.net/content/publications/Bry2009FourLessons.pdf >>, 2009, pp. 114.
Seong et al., "The Architecture and Implementation of a Decentralized Social Networking Platform", Retrieved at << http://prpl.stanford.edu/papers/prpI09.pdf >>, Oct. 2009, pp. 14.
Schenk et al., "Networked Graphs: A Declarative Mechanism for SPARQL Rules, SPARQL Views and RDF Data Integration on the Web", Retrieved at << http://www2008.org/papers/pdf/p585-schenkA4.pdf >>,2008, pp. 10.
Weber et al., "Supporting Flexible Processes Through Recommendations Based on History", Retrieved at << http://wwwis.win.tue.nl/~wvdaalst/publications/p416.pdf >>,2008, pp. 16.

* cited by examiner

*Primary Examiner* — Michael B Holmes

(57) ABSTRACT

An interactive recommendation system generates one or more recommendations (e.g., recommended products, travel destinations, etc.) for a user based on a recommendation model. The recommendation model includes one or more criteria that are used to analyze a datastore of user characteristics (e.g., a user's age, location, past online behavior, etc.) and generate one or more recommendations based thereon. The interactive recommendation system further presents a user interface that allows the user to interactively modify the criteria of the recommendation model and to apply the modified recommendation model to the datastore in order to generate one or more modified recommendations. In this manner, for example, the user can customize the recommendations he or she receives by interacting with the recommendation system to modify the recommendation model used to generate such recommendations.

20 Claims, 8 Drawing Sheets

INTERACTIVE RECOMMENDATIONS

BACKGROUND

Modern consumers spend a considerable amount of time online conducting various activities, including without limitation purchasing products and services, planning travel, getting news, researching medical information, participating in social networking, etc. Various websites, including e-commerce websites, social networking websites, etc., collect a large amount of data about a user and his or her online behavior for data mining purposes.

Examples of information collected by social network websites, often represented as a "social graph," include a user's name, age, gender, education, interests, likes/dislikes, locations, etc. Vendors and online service providers apply various data mining techniques including without limitation statistical analysis, to the collected data to find patterns and relationships. Vendors can use the collected data and the associated patterns and relationships to inform targeted advertisements and viral marketing campaigns, to enhance a user's online experience, etc. For example, targeted marketing may involve providing recommendations to the users, such as recommended products, music, books, travel destinations, etc. However, such recommendations are generally so called "black box" recommendations in that they are generated based on predictions of a user's interests computed from the collected data and the patterns and relationships detected within it. Accordingly, in many circumstances, such black box recommendations are off-target and do not align with a user's actual interests, especially at the time of a particular interaction with the vendor's website.

SUMMARY

Implementations described and claimed herein address the foregoing problems by providing an interactive recommendation system that generates a recommendation (e.g., recommended products, travel destinations, etc.) for a user based on a recommendation model. The recommendation model includes one or more criteria that are used to analyze a datastore of user characteristics (e.g., a user's age, location, past online behavior, etc.) and generate one or more recommendations. The interactive recommendation system further presents a user interface that allows the user to interactively modify the criteria of the recommendation model and to apply the modified recommendation model to the datastore in order to generate one or more modified recommendations. In this manner, for example, the user can customize the recommendations he or she receives by interacting with the recommendation system to modify the recommendation model used to generate such recommendations.

In some implementations, articles of manufacture are provided as computer program products. One implementation of a computer program product provides a computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTION

Figure 1:
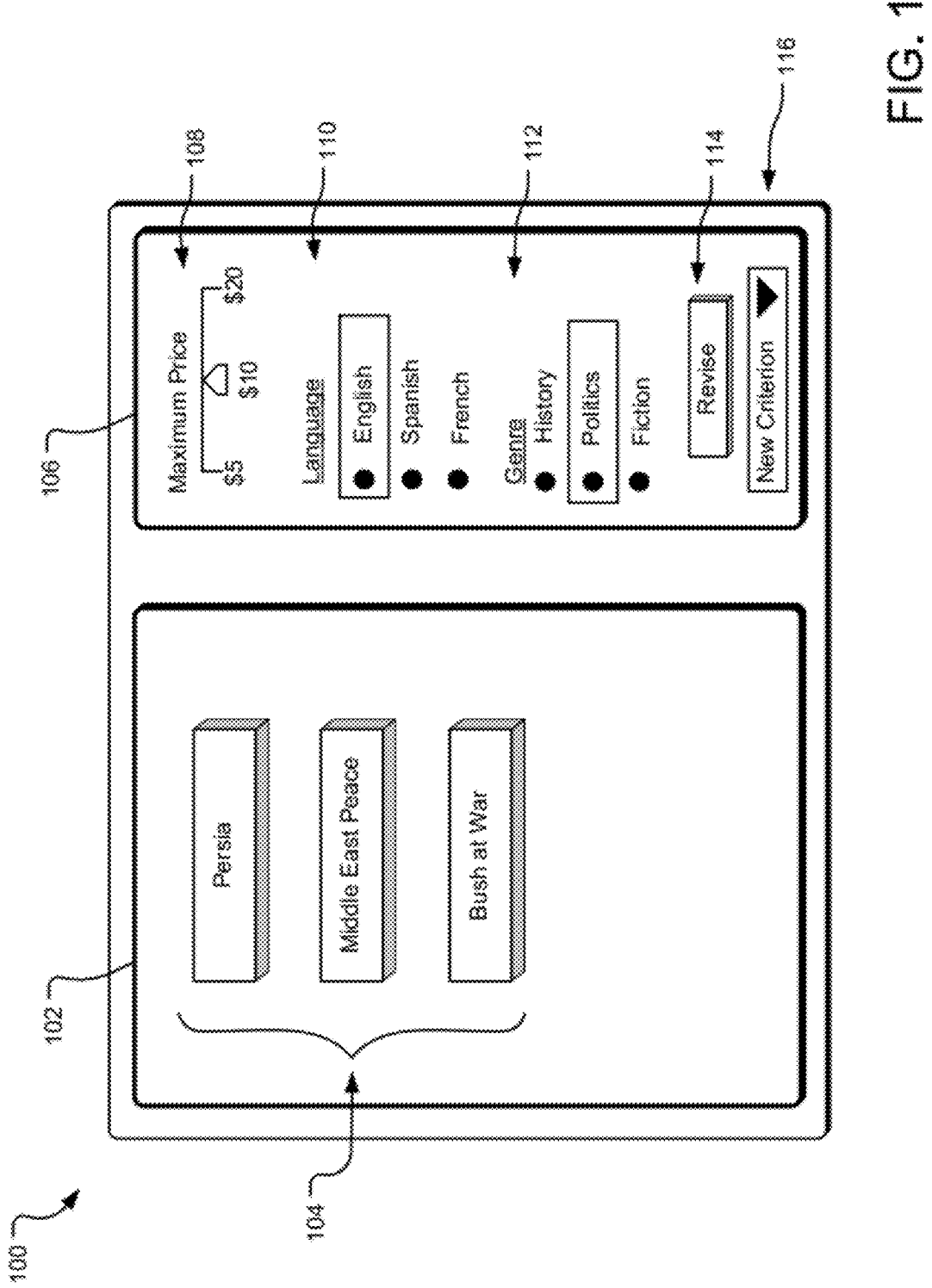
FIG. 1 illustrates an example recommendation interface supporting interactive recommendations.

FIG. 1 illustrates an example recommendation interface 100 supporting interactive recommendations. The recommendation interface 100 includes a recommendation pane 102 that presents recommendations 104 generated based on a recommendation model. The recommendation interface 100 also includes a modification interface 106 for interactively modifying the recommendation model so a user can customize the recommendations he or she receives in the recommendation interface 100.

In one implementation, an interactive recommendation system uses a recommendation model that includes one or more criteria (e.g., conditions) to generate the recommendations 104. Each criterion includes at least one parameter and can be applied to data available to the interactive recommendation system, including without limitation user characteristics, such as the user's past online behavior, income, age, gender, location, etc., and domain-specific data, such as product price, product availability, etc. For example, a recommendation model that generates recommendations 104 for books may include a Maximum Price criterion 108 requiring that a price of a book is below a certain monetary value (a "Maximum Price" parameter). The Maximum Price criterion 108 can then be applied to the prices of books available in inventory to generate the recommendations 104.

In another example (not shown), the recommendation model selects books deemed to be of interest to the user because the user had recently purchased another book about the Iraq War, because the user has friends who have recently purchased books relating to the Middle East, etc. (i.e., examples of user characteristics). In this case, the recommendation model generating the recommendations 104 also evaluates a Language criterion 110 having a parameter "English" and a Genre criterion 112 having a parameter "Politics," such that the recommendations 104 are further filtered to include political books in the English language, as opposed to historical or fictional books or books in non-English languages.

As illustrated, the example modification interface 106 provides the user with information about one or more criteria used to generate the recommendations 104. Thus, the modification interface 106 presents the user with the various parameters, namely the Maximum Price parameter ("$10"), the Language parameter ("English"), and the Genre parameter ("English"), satisfied by the recommendations 104.

Note that the recommendation model may have selected the above set of criteria and associated parameters based on the past purchase behavior of the user. For example, the value of the Maximum Price parameter of the book is selected to be $10 because the user characteristic data indicates that the user tends to purchase books that cost $10 or less. In another example, the value of the maximum price parameter may be selected based on the income level of the user or because the operator of the website providing the recommendation model has provided a rule where the initial setting of the value of the Maximum Price parameter is always set to $10. Other parameter selection conditions may also be employed.

Similarly, the modification interface 106 may select English, Spanish and French as the possible values of the Language parameter because of the user's past behavior, the user's education level, or another user characteristic that is known to the recommendation provider. Furthermore, in one implementation, the list of parameter choices in each of the various criteria 108, 110 and 112 can depend on the availability of books in a datastore. For example, if a new entry for a Hindi book is added to the datastore, the listing of languages may be automatically augmented to list Hindi as a Language parameter choice.

In one implementation, the selection of the three criteria as illustrated in FIG. 1 is based on one or more rules and/or constraints on the datastore used to generate the recommendations interface 100. Alternatively, the vendor may have identified these three criteria because, based on past behavior of a vast number of users, these three are the most popular recommendation criteria used by such users.

While the modification interface 106 provides information about only three criteria (e.g., Maximum Price 108, Language 110, and Genre 112) used in generating the recommendations 104, an alternate implementation provides additional criteria, such criteria having parameters such as user ratings being above a certain minimum, the number of pages in the book being below a certain maximum, etc.

The modification interface 106 presents an interface for interactively changing parameters used in criteria that define the recommendation model. The user can manipulate the modification interface 106 to change the parameters, thereby personalizing the recommendations he or she receives. For example, the user can move the slider in the Maximum Price criterion 108 to increase or decrease the Maximum Price parameter used in the recommendation model.

Modifying any one or more of the criteria 108, 110 and 112 causes corresponding modifications to the recommendation model that is used to generate the recommendations 104 for the user. For example, upon selection of the desired values for various criteria 108, 110 and 112, the user can select the "Revise" button 114, which causes the interactive recommendation system to alter the recommendation model to include the modified criteria and to generate a modified recommendation.

In an alternate implementation, a user can specify an additional criterion for modifying the recommendation model. For example, the user can select such a new criterion using a drop-down menu 116 and specify that the modified recommendation model also use the author's nationality in generating modified recommendations. In one implementation, the options available in such a drop-down menu 116 depend upon the data in the datastore.

Figure 2:
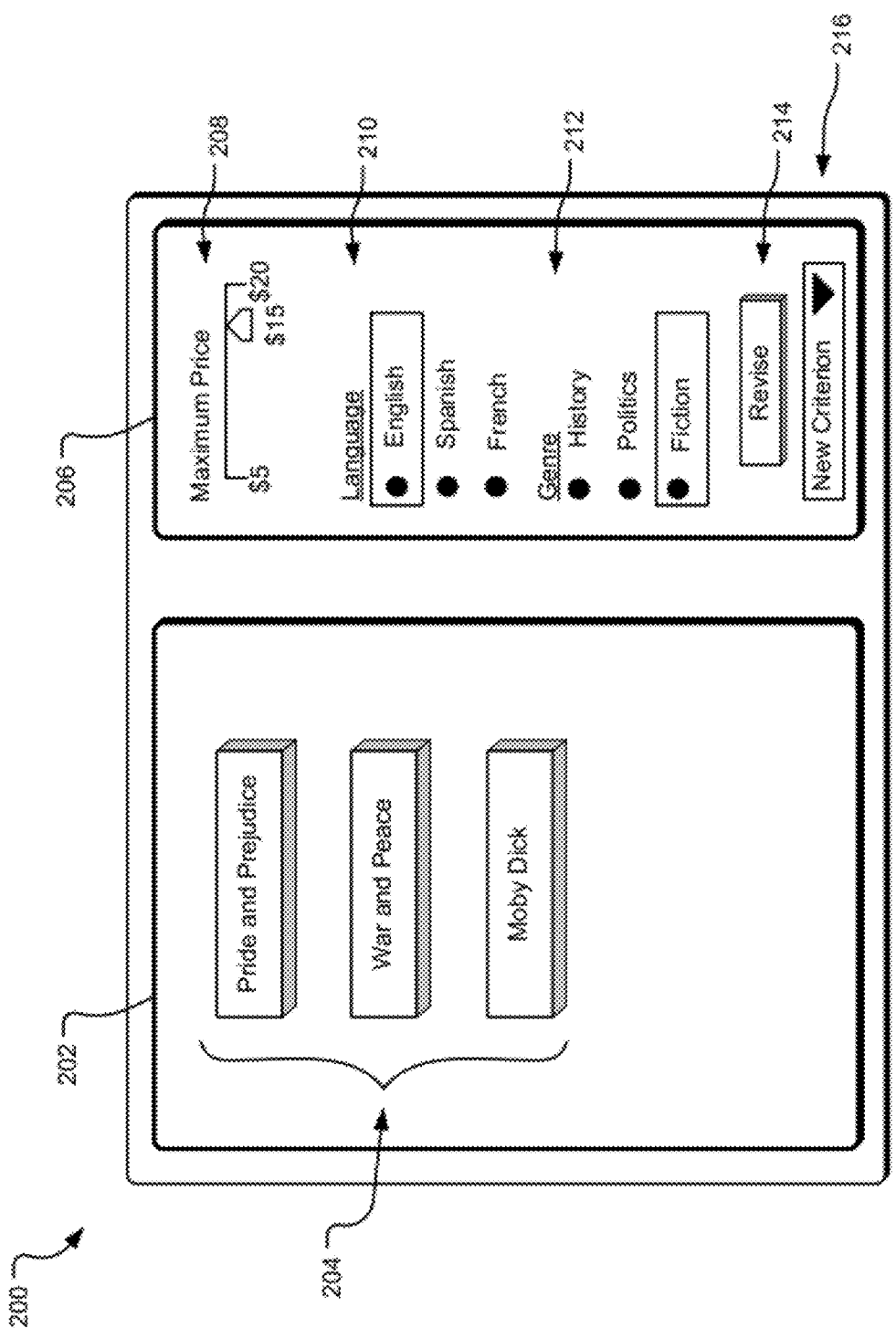
FIG. 2 illustrates an example recommendation interface showing modified recommendations.

FIG. 2 illustrates an example recommendation interface 200 showing modified recommendations 204. The recommendation interface 200 includes a recommendation pane 202 that presents modified recommendations 204 generated based on a modified recommendation model. The recommendation interface 200 also includes a modification interface 206 for interactively modifying the recommendation model with modified criteria so a user can customize the recommendations he or she receives in the recommendation interface 200.

For example, the user has modified the value of the Maximum Price parameter in the criterion 208 to be $15 and the value of the Genre parameter in the criterion 212 to be "Fiction" (as compared to the values of $10 and "Politics" used in FIG. 1). The user leaves the value of the Language parameter in the criterion 210 as "English." Based on these criteria 208, 210 and 212, when the user selects a Revise button 214, a new list of books is presented as modified recommendations 204 in the recommendation pane 202. Note that the user can change one or more of the various criteria 208, 210 and 212 again to further modify the recommendation model that is used to generate the recommendations. Other criteria (not shown) may also be considered in the original recommendation model and the modified recommendation model.

Figure 3:
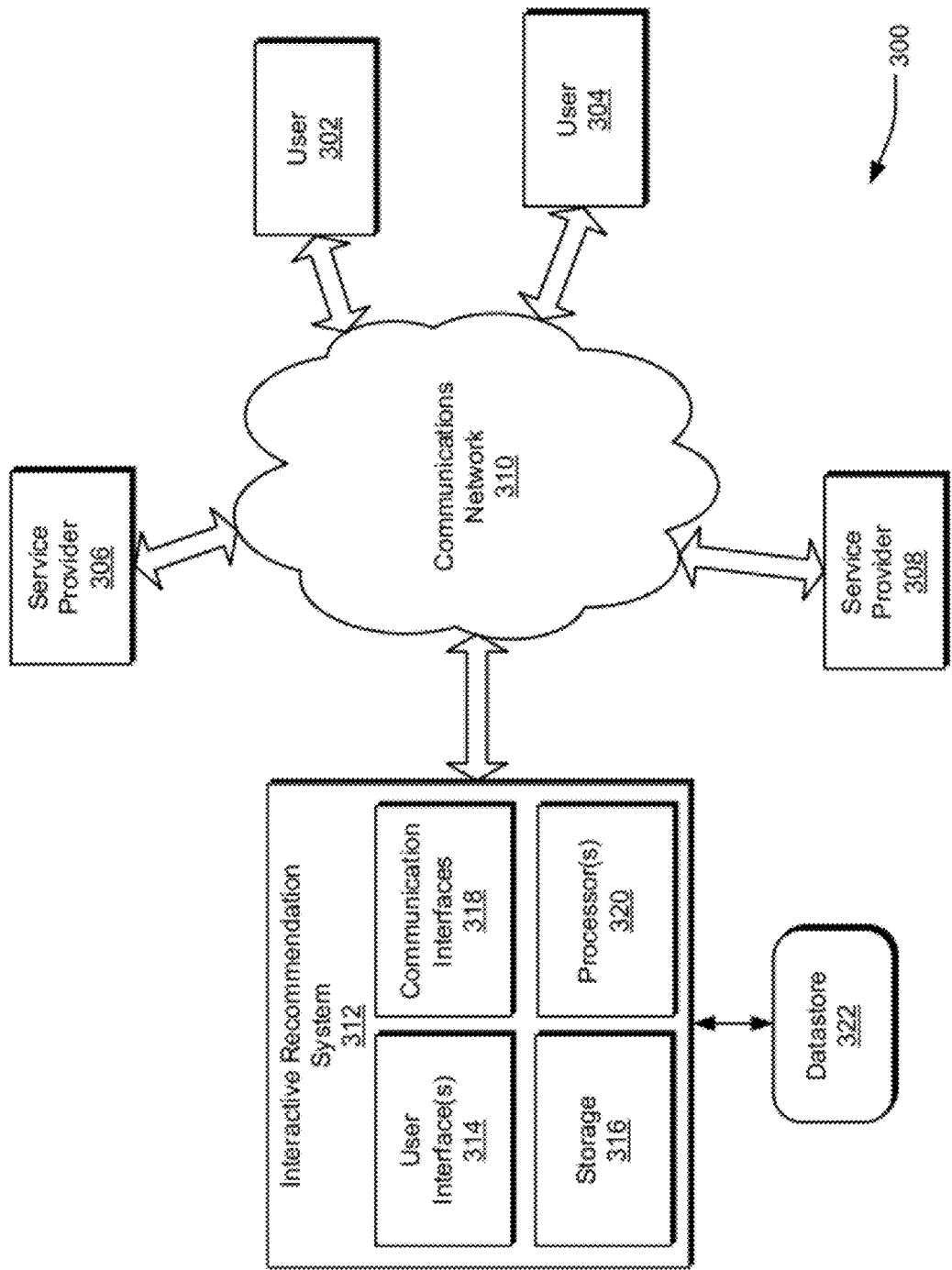
FIG. 3 illustrates an example network environment used to provide interactive recommendations to users.

FIG. 3 illustrates an example network environment 300 used to provide interactive recommendations to users. The environment 300 includes a communication network 310 that is used to communicate between various users 302 and 304, service providers 306 and 308, and an interactive recommendation system 312. In one implementation, the communication network 310 is the Internet, although other implementations may use a virtual private network (VPN), a local area network (LAN), or any other network that can communicatively connect one or more computing devices, whether wired or wireless.

The users 302 and 304 are end users communicatively connected to the communication network 310 using computing devices such as a computer, a personal data assistant (PDA), a cell phone, a smart-phone, etc. Each of the users 302 and 304 uses the communication network 310 to get information from various websites connected to the communication network 310, to purchase merchandise from website of vendors, to connect to other users, to use social networking websites, etc.

Various relationships among the service providers 306 and 308 and the users 302 and 304. For example, the service provider 306 can be an e-commerce service provider, such as an online bookseller, a DVD rental website, etc., or a website that provides social networking services to the users 302 and 304. In another example, the users 302 and 304 access online commercial services provided by the service provider 306 via a social networking website provided by the service provider 308, or vice-versa. In yet another example, the users 302 and 304 may interact with each other on the social networking website provided by the service provider 308, where the user 302 may suggest to the user 304 about a purchase made by user 302 on online commercial website provided by service provider 306.

Each of the service providers 306 and 308 collects or accesses data about the online behavior of the users 302 and 304. For example, the service provider 306 maintains information about prior online commercial activities, such as purchase of books, etc., by each of the users 302 and 304. On the other hand, the service provider 308 maintains data about social networking habits of the users 302, 304, such as their music preferences, their vacation travel destinations, etc. In one implementation, the service providers 306 and 308 collaborate with each other to share their data about the users. The service providers 306 and 308 analyze such data to detect patterns in the behavior of the users 302 and 304. Furthermore, the service providers 306 and 308 may also provide recommendation to the users 302 and 304 based on their own past behavior and/or each other's past behavior.

An implementation of the computing environment 300 also includes an interactive recommendation system 312, which is shown as a separated entity connected to the communications network 310 but may alternatively be integrated into any of the systems connected to the communications network 310. As shown, the interactive recommendation system 312 is communicatively connected to the communications network 310 such that it can communicate directly with the users 302 and 304 and with the service providers 306 and 308. For example, the interactive recommendation system 312 automatically collects any information about the users 302 and 304 that is also collected by the service providers 306 and 308. In another implementation, another service provider connected to the communication network 310 provides all information about all online activities of the users 302 and 304, including the users' activities related to the service providers 306 and 308. The interactive recommendation system 312 stores such information on a storage 316. Alternatively, the interactive recommendation system 312 is connected to one or more data storage systems (not shown here) used for storing commercial and/or social data of a vast number of users, including users 302 and 304.

The interactive recommendation system 312 also includes a user interface 314, a communications interface 318, and one or more processors 320. The interactive recommendation system 312 communicates to the communication network 310 using the communication interface 318. A user, such as an administrator of the interactive recommendation system 312, interacts with the interactive recommendation system 312 using the user interface 314. The processors 320 implement instructions stored on the storage 316 and/or instructions provided by a user via the user interface 314. The storage 316 stores instructions for one or more computer programs and such instructions are executable on the processors 320.

For example, the storage 316 includes one or more instructions for a recommendation model to generate recommendations for the users 302 and 304 and instructions for generating a modification interface presented to the users 302 and 304 to interactive modifications the recommendation model. Further instructions stored in the storage 316 generate a modified recommendation by analyzing a datastore 322 using the modified recommendation model.

The datastore 322, which may be local, remote, distributed, etc., used to store the user characteristics may provide an ability to add one or more declarative models of rules, constraints, and/or equations for querying the datastore. Such declarative models provide information about which parameters in a query can be changed by a user and for what purpose. For example, declarative models represent a set of fact that are true about the model, and the full set of facts defining such a model constitute a specification for the model.

In one implementation, the datastore 322 analyzed for generating the recommendations is a resource description framework (RDF) datastore, although other datastore configurations are contemplated. An RDF datastore stores information about a number of web resources in the form of subject-predicate-object expressions (known as triples in RDF terminology). In such expressions, the subject denotes the resource, and the predicate denotes traits or aspects of the resource and expresses a relationship between the subject and the object. For example, one way to represent the notion that "the sky has the color blue" in RDF is as to use a triple with "the sky" as the subject, "has the color" as the predicate, and "blue" as the object.

In an implementation, an RDF datastore contains information about the users 302 and 304 in form of expressions. An example expression may be that "User 302 is a male." The RDF datastore also includes information about a vast number of other users and other resources in form of expressions. For example, the RDF datastore may include expressions about a number of users where the predicate is "has purchased" and the object is "a fiction book." These expressions in the RDF datastore are modeled so that they can be queried to get useful information. Specifically, an RDF datastore may be queried using SPARQL, a query language for RDF, or another appropriate query language.

In one implementation, the interactive recommendation system 312 receives recommendation model modification information from a user and generates queries to the RDF datastore to generate modified recommendations. For example, such queries may be SPARQL queries that, when executed on the RDF datastore, generate recommendations. The interactive recommendation system 312 communicates such modified recommendations to the users 302 and 304 for presentation at their respective computation devices.

Figure 4:
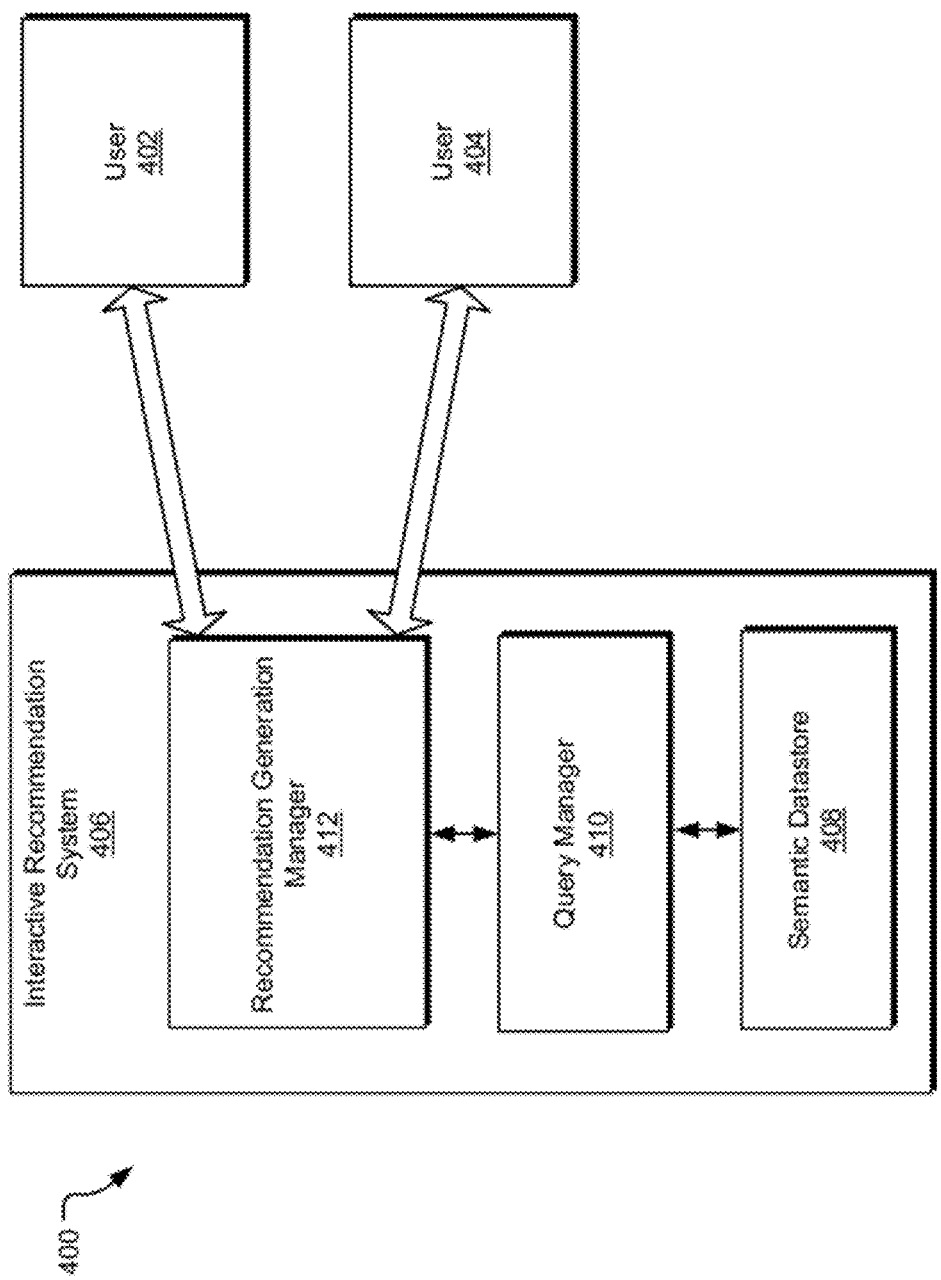
FIG. 4 illustrates components of an interactive recommendation system in communication with users.

FIG. 4 illustrates components of an interactive recommendation system 406 in communication with the users 402 and 404. For example, the users 402 and 404 communicate directly with the interactive recommendation system 406 using a modification interface used for modifying a recommendation. Alternately, the users 402 and 404 interact with the interactive recommendation system 406 via a modification interface agent located on website of a service provider. For example, when a user visits a website of an online commercial service provider, such a website communicates the information about the user to the interactive recommendation system 406. In response, the interactive recommendation system 406 generates a recommendation and communicates the recommendation to the user.

In such an implementation, a recommendation generation manager 412 uses the information about the user to request a recommendation from a query manager 410. The query manager 410 receives the request from the recommendation generation manager 412, generates a query, and submits the query to a semantic datastore 408. In one implementation, the semantic datastore 408 is an RDF datastore that stores a vast number of expressions about a number of resources, including expressions about users, including the users 402 and 404. In one implementation, the query manager generates queries using SPARQL query language. Subsequently, the query manager 410 communicates the results from the SPARQL queries to the recommendation generation manager 412.

The recommendation generation manager 412 communicates the results of the query in the form of recommendations to the users 402 and 404. In one implementation, the recommendation generation manager 412 also generates and communicates a recommendation modification interface to the users 402 and 404. Such a recommendation modification interface generates a recommendation modification interface on the user's computing device. The user can use the recommendation modification interface to interactively change one or more criteria for generating recommendations. The recommendation generation manager 412 uses the new criteria provided by the users 402 and 404 to generate modified queries using the query manager 410. The query manager 410 submits the modified queries to the semantic datastore 408 to generate modified recommendations.

Figure 5:
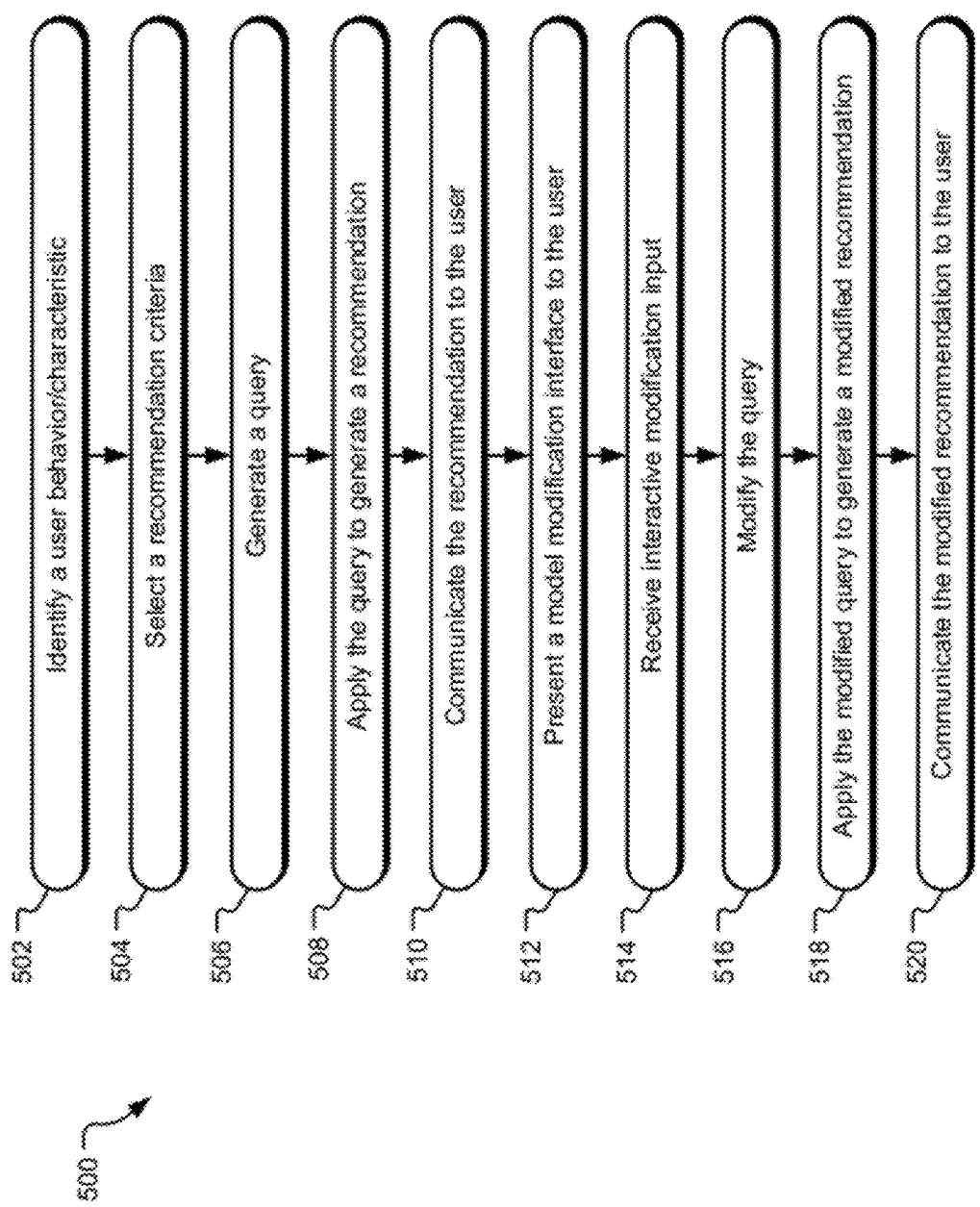
FIG. 5 illustrates example operations for providing interactive recommendations.

FIG. 5 illustrates example operations 500 for providing interactive recommendations. An identifying operation 502 identifies one or more characteristics about a user to which a recommendation is to be provided. For example, such user characteristics may include the user's age, income, gender, preferences, past social behavior, past online commercial history, etc. A selecting operation 504 selects an initial recommendation model to use for generating user recommendations. In one example, the selecting operation 504 can select an initial recommendation model that selects recommendation based only on the purchasing power of the user. In another example, the selecting operation 504 can select an initial recommendation model that generates recommendations based on purchases by all users in the user's age category over the past one month.

Subsequently, a generating operation 506 generates a query based on the initial recommendation model selected by the selecting operation 504. The generating operation 506 generates the query based on one or more rules and/or constraints specified by the queried datastore. For example, if the queried datastore is an RDF datastore including data in the form of a number of expressions, the generating operation 506 generates the query so that these expressions are queried in compliance with the rules and/or constraints specified by the RDF datastore. In one implementation, the generating operation 506 generates the query using SPARQL query language. Following is a sample of a query structure generated by the generating operation 506:

```
' who out of my friends should I invite to the baseball game
PARAMS
{
    @me : ENTREF,
    @interest : ENTREF,
    @nearPref : NUMBER,
    @simPref : NUMBER,
}
WITH
{
    FUNCTION :Rank(?near, ?sim)
    {
        ' custom ranking based on @nearPref and
        ' @simPref - controlled by sliders?
        <expressions for computing ranking>
    }
    FUNCTION :NearBy(?person1, ?person2)
    {
        ' return nearness score based on current geographic location
        <expressions for computing nearness score>
    }
    FUNCTION :Similar(?person1, ?person2)
    {
        ' return similarity score based on shared interests, length of
        ' friendship, social network activity (e.g., # messages
        exchanged)
        <expressions for computing similarity score>
    }
}
SELECT ?friend ?rank
WHERE
{
    @me :hasFriend ?friend .
    ?friend :hasInterest @interest .
    SELECT :Rank(?nearness, ?similarity, @simPref) AS ?rank
    WHERE
    {
        :NearBy( @me, ?friend ) AS ?nearness.
        :Similar( @me, ?friend ) AS ?similarity.
    }
}
ORDER BY ?rank
LIMIT 5
```

The example query illustrated above queries an RDF datastore to select up to five friends that the system would recommend to invite to a baseball game, based on similarity and nearnesss. The friends are selected from a social graph based on a similarity condition specified by the Similar function and a nearness condition specified by the NearBy function. The query results in a set of ranked friends the system recommends would be recommend for an invitation. In one implementation of the generating operation 506, one or more rules and constraints specified by the RDF datastore model limit the type of templates used with a CONSTRUCT tag. Similarly, the one or more rules and constraints specified by the RDF datastore model also restricts the expressions that are used with the WHERE clause. The expressions defining the Similar, NearBy, and Rank functions are represented by angle bracketed placeholders in the sample.

An application operation 508 applies the query to a datastore to generate a recommendation. For example, if the query requests "a list of French cookbooks written by football players," the application operation 508 will generate a recommendation including all French cookbooks written by football players, if any. As discussed above, because the query generation operation 506 generates the query based on an initial recommendation model selected by the selecting operation 504, the resulting recommendation is responsive to such an initial recommendation model. Subsequently, a communicating operation 510 communicates the recommendation to the user. For example, the communicating operation 510 communicates the recommendation to a computing device, such as a computer, smart-phone, etc., used by the user. In one implementation, the computing device displays the recommendation on a recommendation pane of an interface on such computing device, although other types of presentation may be employed (e.g., printing, text to speech, etc.).

A presentation operation 512 presents a modification interface to the user to allow the user to modify one or more criteria used in the initial recommendation model. In one implementation, the interactive recommendation system prepares and sends data or instructions defining a user interface and underlying functionality to the computing device of a user. The modification interface allows a user to customize the recommendations he or she receives from a recommendation provider. For example, if one of the criteria in the initial recommendation model specifies that the recommendations are limited to only cookbooks, a user can modify such a criterion to specify that the recommendations are limited to only baseball books. Alternatively, the user can add additional criteria to the initial recommendation model. For example, in addition to all the criteria in the initial recommendation model, the user can add an additional criterion to specify that the recommendation are restricted to only books published in 1999.

A receiving operation 514 receives one or more modifications to the initial recommendation model from the user's computing device. In one implementation, the receiving operation 514 communications via the modification interface to receive such modifications from the user. For example, a user can select one or more parameters from a drop down menu to modify a criterion of the initial recommendation model. Subsequently, upon receiving a "revise" instruction from the user, the receiving operation 514 receives a revised criterion, which is input to the initial recommendation model to yield a modified recommendation model.

A modifying operation 516 modifies a query representing one of the criteria initially generated by the generation operation 506 to generate a modified query. Such a modified query uses the modified criteria as specified by the user via the modification interface. For example, the modifying operation 516 changes one or more expressions used with the WHERE clause of the Query1 illustrated above to generate a modified query. Alternately, the modifying operations 516 adds one or more expressions to the WHERE clause of Query1 to generate a modified query.

An application operation 518 applies the modified query to generate a modified recommendation. The functioning of the application operation 518 is generally similar to the functioning of the application operation 508. Specifically, while the application operation 508 uses a query based on the initial recommendation model, the application operation 518 uses a query based on the modified recommendation model. Subsequently, a communication operation 520 communicates the modified recommendation to the user. For example, the communicating operation 520 communicates the modified recommendation to a computing device, such as a computer, smart-phone, etc., used by the user. The computing device displays the modified recommendation on a recommendation pane of an interface on such computing device.

Figure 6:
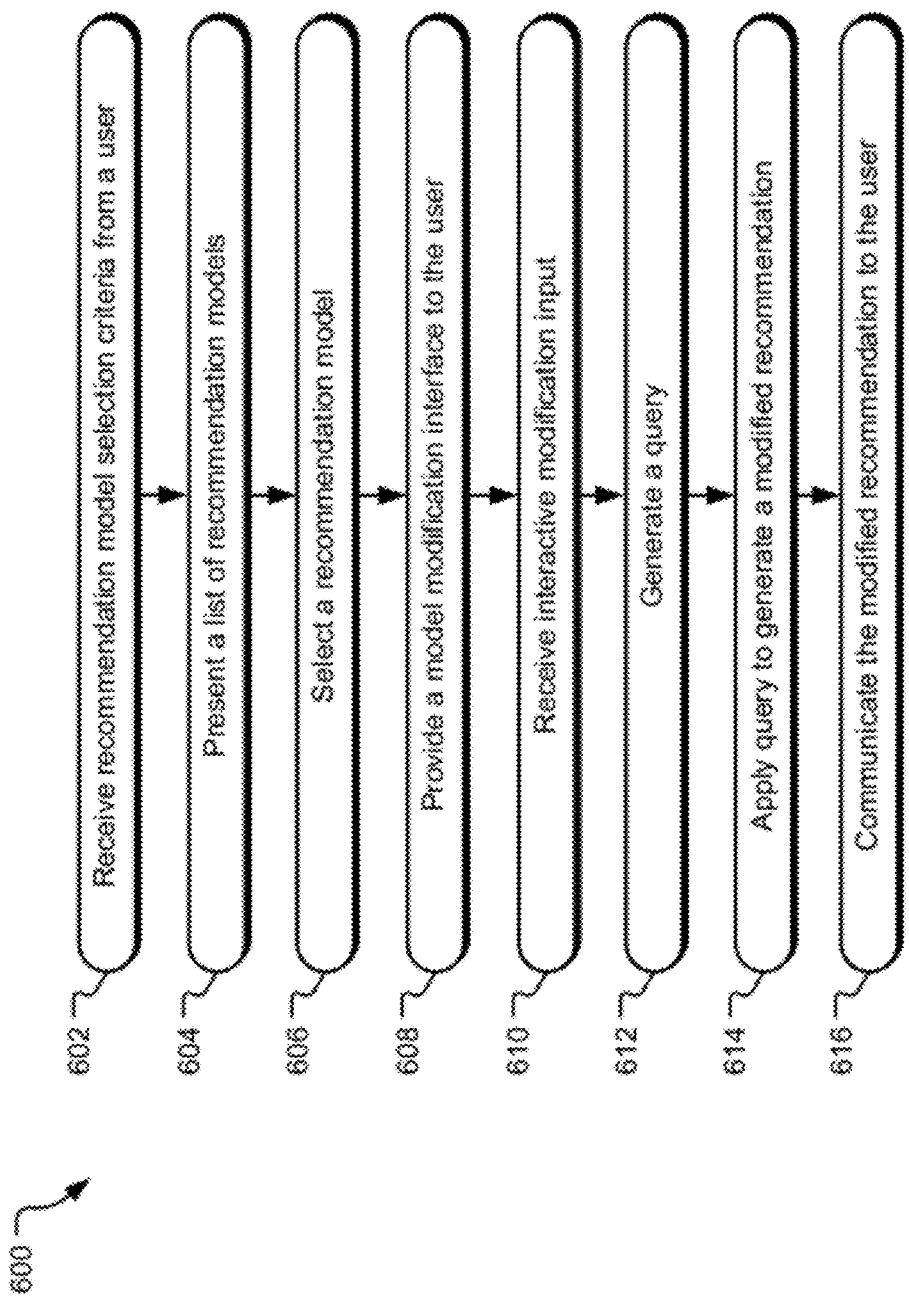
FIG. 6 illustrates an alternate example of operations for providing interactive recommendations.

FIG. 6 illustrates an alternate example of operations for providing interactive recommendations. The operations illustrated in FIG. 6 allow a user to select a recommendation model that will be used for generating recommendations. Such selected recommendation models are saved for future recommendation generation purposes. A receiving operation 602 receives one or more recommendation model selection criteria from a user. For example, a user can specify that he or she is interested in using recommendation models used by or generated by other users that are in his or her best friend forever list. In another example, the user can specify that he or she is interested in using recommendation models used by famous authors.

In one implementation, a presenting operation 604 presents a list of such recommendation models to the user on a recommendation model selection interface. The presenting operation 604 generates such a list of recommendation models using the recommendation model selection criteria from the user.

In an alternate implementation, the presenting operation 604 generates such a list of recommendation models without receiving any recommendation model selection criteria from the user. As an example of such an implementation, a bookseller's website has a recommendation model selection interface that lists a plurality of pre-defined recommendation models. Furthermore, a plurality of descriptive information associated with each of the pre-defined recommendation models. For example, the recommendation model selection interface also provides information about creator or user of such recommendation model. Thus, the recommendation model selection interface on the website of a bookseller may list one recommendation model created and used by Salman Rushdie, another recommendation model created and used by John Grisham, etc. Alternatively, the recommendation models listed on such a recommendation model selection interface can also be selected based on characteristics of the user, such as the user's friends, family, etc. Other implementations are contemplated.

A selection operation 606 receives a selection of a recommendation model from the user. Thus, a user may select one of the various models listed on the recommendation model selection interface for generating recommendations. Thus, for example, if a user is selecting legal books, he/she may select the recommendation model selected by John Grisham. In one implementation, the selection operation 606 also provides a user with an option to attach a selected recommendation model to a category. For example, a user can select a recommendation model created by John Grisham for generating recommendations about legal books, whereas the user can select a recommendation model created by his/her spouse for generating recommendations about cookbooks, etc. The website saves such selection of recommendation models and their relation to a category for future use by the user.

A providing operation 608 provides a model modification interface to the user to allow the user to modify one or more criteria used in the selected recommendation model. For example, if one of the criteria in the selected recommendation model specifies that the recommendations are limited to only legal books, a user can modify such a criterion to specify that the recommendations are limited to only medical books. Alternatively, the user can add an additional criterion to the initial recommendation model. Thus, for example, in addition to all the criteria in the initial recommendation model, the user can add an additional criterion to specify that the recommendation are restricted to only short stories published by the New Yorker.

A receiving operation 610 receives such modification to the initial recommendation model. In one implementation, the receiving operation 610 uses a modification interface to receive such modifications from the user. For example, a user can select one or more parameters from a drop down menu to modify a criterion of the selected recommendation model. Subsequently, upon receiving a "revise" instruction from the user, the receiving operation 610 receives such a revised criterion. Alternately, the receiving operation 610 uses one or more sliding bars, an input box, etc., of the modification interface to receive additional modification to one or more criteria used in the selected recommendation model.

A generation operation 612 generates a query based on the modified criteria. Such a query uses the modified criteria as specified by the user via the modification interface. In one implementation, such a query is generated using SPARQL query language. Other query languages may also be used. In one implementation, the service provider's website saves the query for generating recommendations for the user in the future.

An application operation 614 applies the query to generate a recommendation. The functioning of the application operation 614 is generally similar to the functioning of the application operation 508. Specifically, the application operation 614 uses a query based on the modified recommendation model. Subsequently, a communication operation 616 communicates the modified recommendation to the user. For example, the communicating operation 616 communicates the modified recommendation to a computing device, such as a computer, smart-phone, etc., used by the user. The computing device displays the modified recommendation on a recommendation pane of an interface on such computing device.

Figure 7:
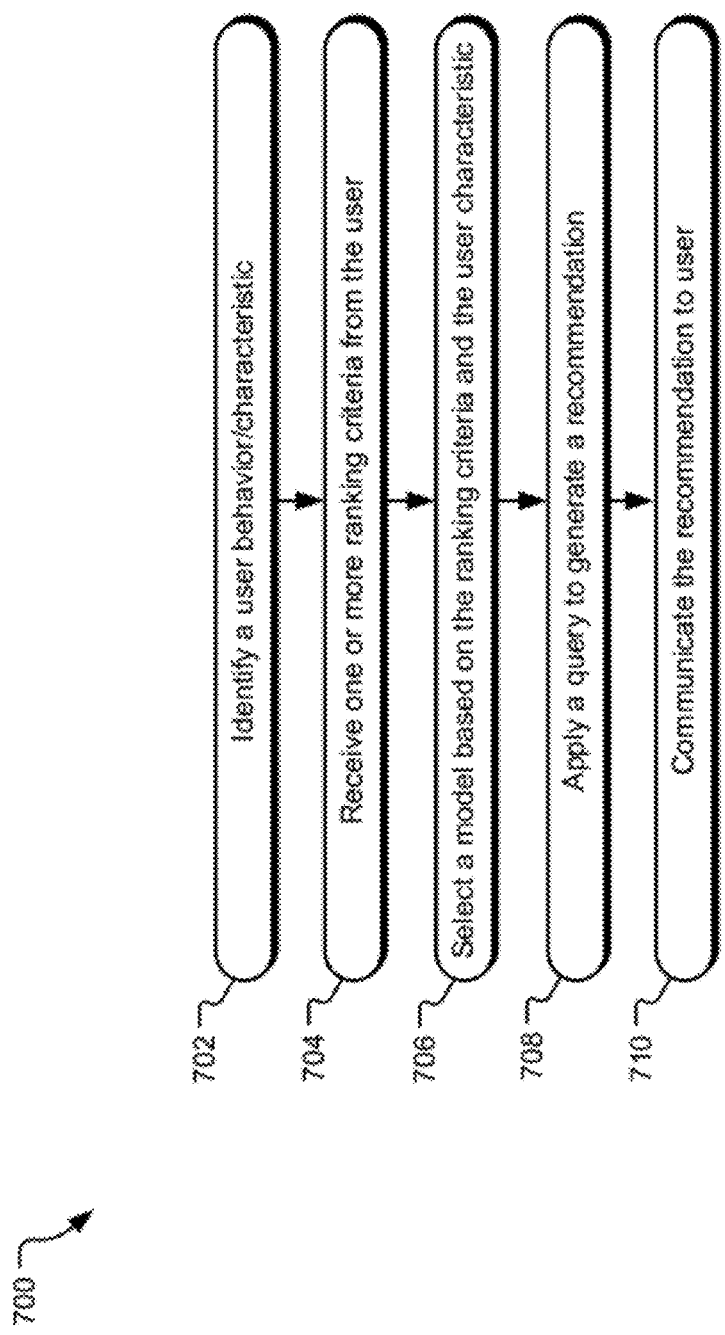
FIG. 7 illustrates an alternate example of operations for providing interactive recommendations.

FIG. 7 illustrates an alternate example of operations for providing interactive recommendations. The operations illustrated in FIG. 7 allow a vendor to present a recommendation model that may be better suited for the generating recommendation to a user. An identification operation 702 identifies one or more user characteristics, such as user name, user age, past behavior, etc. Subsequently, a receiving operation 704 receives one or more ranking criteria from the user. For example, one such as ranking criterion is the popularity of recommendation models used by other users. Another such ranking criterion may be the most used recommendation model for generating recommendations for political books. In an alternate implementation, the user is allowed to rank various recommendation models based on one or more user characteristics. Thus, for example, the user criterion may be the most used recommendation model where the ranking is restricted to models used by the user's colleagues.

A selection operation 706 uses the one or more user characteristics and the one or more ranking criteria provided by the user to select a recommendation model. While the implementation illustrated in FIG. 7 does not allow the user to modify the selected recommendation model, in an alternate implementation, the user can change one or more criteria of the selected recommendation model. Subsequently, an application operation 708 generates a query based on the selected recommendation model and applies the query to a datastore for generating recommendations. A communication operation 710 communicates the recommendations to the user.

Figure 8:
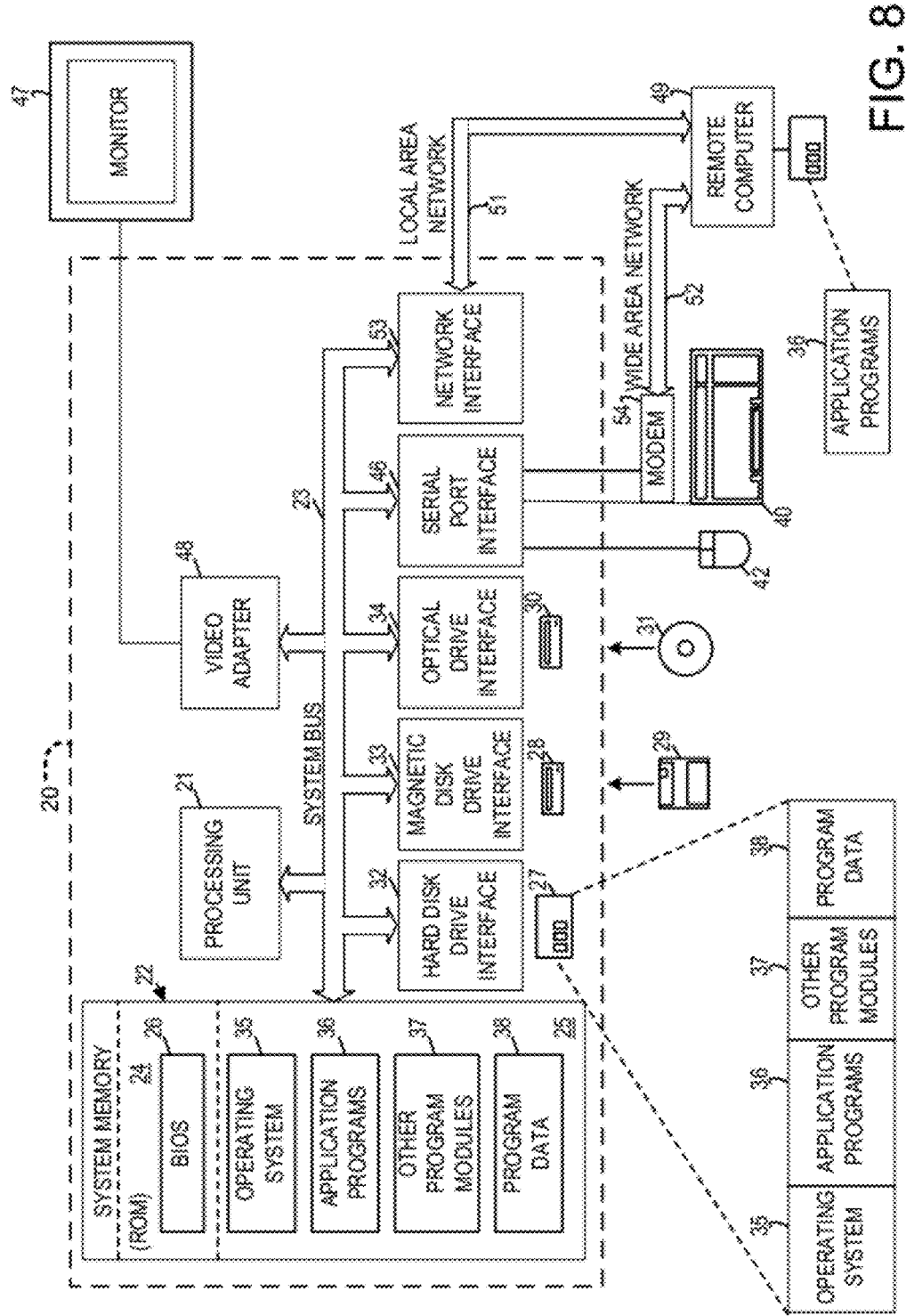
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a user interface, a communication interface, a recommendation generation manager, a query manager a semantic datastore, and other program modules and services may be embodied by instructions stored in memory 22 and/or storage devices 29 or 31 and processed by the processing unit 21. User characteristics, recommendation models, expressions, and other data may be stored in memory 22 and/or storage devices 29 or 31 as persistent datastores. Further, local computing systems, remote data sources and/or services, and other associated logic represent hardware and/or software configured to provide interactive recommendation services for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Because many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   identifying one or more characteristics of a user to which a recommendation is to be provided;
   selecting an initial recommendation model;
   generating a recommendation for the user based on the initial recommendation model;
   communicating the recommendation to the user;
   presenting a modification interface to the user to allow the user to modify the initial recommendation model;
   receiving from the user one or more criteria to modify the initial recommendation model;
   modifying the one or more criteria to generate a modified recommendation model; and
   generating a modified recommendation using the modified recommendation model.

2. The method of claim 1 further comprising adding a new criterion to the recommendation model to generate the modified recommendation model.

3. The method of claim 1 wherein the one or more criteria uses at least one or more user characteristics as a parameter.

4. The method of claim 3 wherein the one or more user characteristics includes past user behavior.

5. The method of claim 1 wherein generating the modified recommendation further comprises generating the modified recommendation based on mining social data using the modified recommendation model.

6. The method of claim 1 wherein generating the modified recommendation further comprises generating the modified recommendation based on mining online commercial data using the modified recommendation model.

7. The method of claim 1 wherein generating the modified recommendation further comprises generating the modified recommendation based on mining a resource description framework (RDF) datastore.

8. The method of claim 1 further comprising:
   receiving from the user a recommendation model selection criterion;
   generating a plurality of recommendation models that meet the recommendation model selection criterion;
   receiving from the user a selection of one of the plurality of recommendation models; and
   generating the modified recommendation by analyzing the datastore using the selected recommendation model.

9. The method of claim 1 further comprising:
   generating a plurality of recommendation models, wherein the plurality of recommendation models is selected based on a ranking criteria;
   receiving from the user a selection of one of the plurality of recommendation models; and
   generating the modified recommendation by analyzing a datastore using a SPARQL query based on the selected recommendation model.

10. The method of claim 9, wherein the ranking criteria is based on rankings provided by a plurality of users.

11. One or more computer-readable storage media encoding computer-executable instructions for executing on a computer system a computer process, the computer process comprising:
    presenting to a user a list of a plurality of recommendation models;
    receiving a selection of one of the plurality of recommendation models from the user;
    generating a recommendation for the user based on the selected recommendation model;
    presenting a modification interface to the user to allow the user to modify the selected recommendation model;
    receiving from the user one or more criteria to modify the selected recommendation model;
    modifying the one or more criteria to generate a modified recommendation model; and
    generating a modified recommendation using the modified recommendation model.

12. The one or more computer-readable storage media of claim 11 wherein the computer process further comprises:
    adding a new criterion to the recommendation model to generate the modified recommendation model.

13. The one or more computer-readable storage media of claim 11 wherein generating the modified recommendation further comprises:
    generating the modified recommendation based on mining at least one of (1) social data using the modified recommendation model and (2) commercial data using the modified recommendation model.

14. The one or more computer-readable storage media of claim 11 wherein the computer process further comprises receiving from the user a recommendation model selection criterion; and generating the list of recommendation models to be presented to the user based on the received recommendation selection criterion.

15. The one or more computer-readable storage media of claim 11 wherein generating the modified recommendation comprises generating the modified recommendation by analyzing a resource description framework (RDF) datastore using a query generated from the selected recommendation model the computer process further comprises: generating a plurality of recommendation models.

16. The one or more computer-readable storage media of claim 11 wherein the one or more criteria use at least one or more user characteristics as a parameter.

17. A system comprising:
- an interactive recommendation manager generating a recommendation for a user based on a recommendation model, the recommendation model comprising one or more criteria, the recommendation model selected by the user;
- a recommendation modification manager modifying the at least one of the one or more criteria based on an interactive modification input from the user to generate a modified recommendation model; and
- a recommendation generation manager generating a modified recommendation using the modified recommendation model.

18. The system of claim 17 wherein the recommendation modification manager further comprising adding a new criterion to the recommendation model to generate the modified recommendation model.

19. The system of claim 17 wherein the one or more criteria uses past user behavior as a parameter.

20. The system of claim 17 wherein the recommendation generation manager generates the modified recommendation based on mining a resource description framework (RDF) datastore.

* * * * *